Nov. 27, 1962 S. T. COMFORT 3,065,601
RESERVOIR FOR HYDRAULIC SYSTEM OF AN ENGINE DRIVEN VEHICLE
Filed March 7, 1960
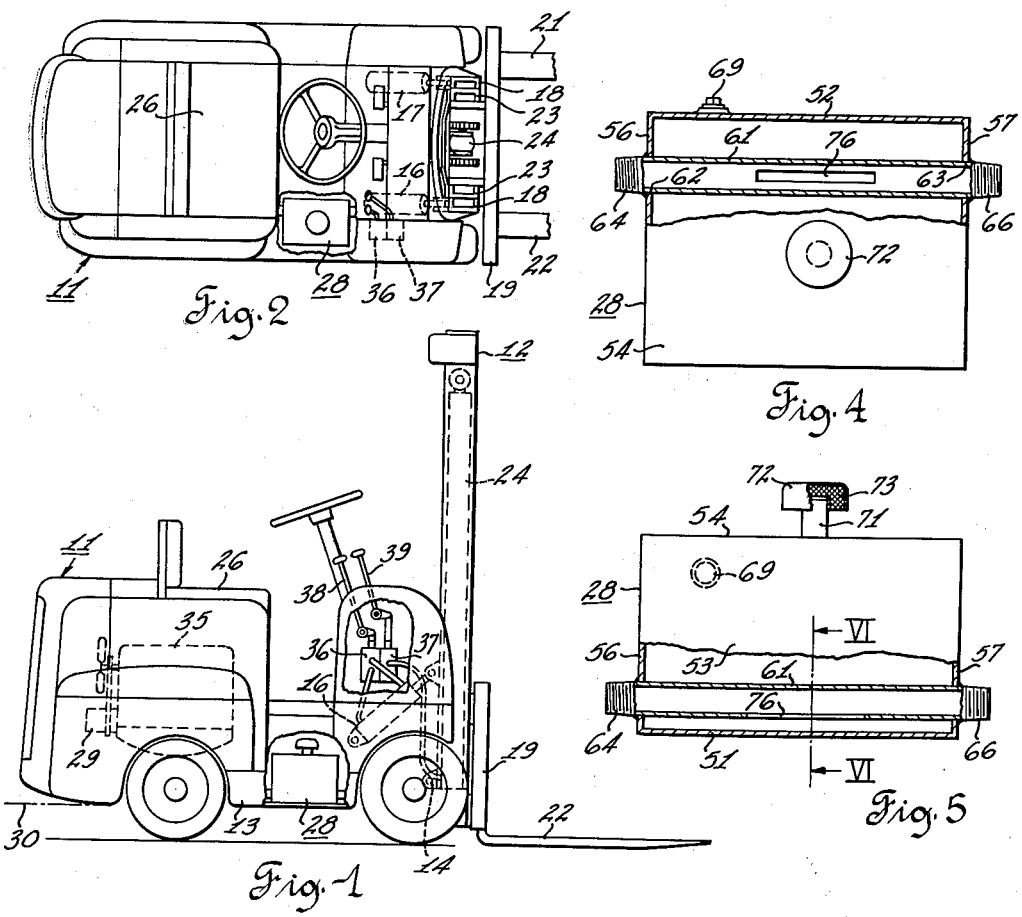
Inventor
Samuel T. Comfort
by Charles L. Schwab
Attorney

United States Patent Office 3,065,601
Patented Nov. 27, 1962

3,065,601
RESERVOIR FOR HYDRAULIC SYSTEM OF AN ENGINE DRIVEN VEHICLE
Samuel T. Comfort, Homewood, Ill., assignor to Allis-Chalmers Manufacturing Company, Milwaukee, Wis.
Filed Mar. 7, 1960, Ser. No. 13,062
1 Claim. (Cl. 60—52)

This invention relates to obtaining maximum performance from a given volume hydraulic reservoir and has particular application to installations where a reservoir sump is not practical.

In motor vehicles such as fork lift trucks it is desirable to have a predetermined running clearance on the underside of the chassis so that the vehicle may traverse uneven floors, ramps and storage areas. Also, it is desirable that the volume of the reservoir be kept to a minimum so as to conserve space on the vehicle. Further, it is desirable to place the hydraulic reservoir as low as possible so that components of the hydraulic system may be removed for replacement or repair without drainage of the hydraulic fluid from the system. Thus, the hydraulic reservoir should be positioned as low as possible on the vehicle, this being near its running clearance, and it should be of the flat bottom design, inasmuch as a sump would cause the rervervoir to take up a greater height. A sump protruding below the chassis would not be satisfactory since the running clearance would be reduced.

Heretofore, hoods have been placed over inlets and outlets inside flat bottom hydraulic reservoirs in an effort to reduce the turbulence and to increase the usable capacity of the reservoir. These hoods are expensive to provide and have not remedied the problem of air entrapment in an entirely satisfactory manner. As is understood by those familiar with hydraulic systems, turbulence causes air to be entrapped in the fluid and this results in foaming and unsatisfactory operation. In the usual fork truck hydraulic system, the pump is operating whenever the engine is running since the pump is customarily driven by the engine. Accordingly, in such a system hydraulic fluid is being drawn from the reservoir and returned to the reservoir even though hydraulic motors operated by the system are not being actuated. This continuous circulation of fluid will result in foaming in those systems where flow through the reservoir is turbulent.

Also in prior art structures, when the fluid level in the reservoir is low, due to full extension of a single acting ram, for insatnce, and the pump is operating at high output, air is often drawn into the pump inlet due to the depression of the fluid level near the reservoir outlet.

It is an object of this invention to provide an improved hydraulic system for an engine driven vehicle wherein the hydraulic fluid reservoir has a flat bottom at approximately the running clearance of the vehicle and has a greater usable volume than heretofore afforded.

It is a further object of this invention to provide a flat bottom reservoir wherein the quantity of usable fluid is increased.

It is a further object of this invention to provide a flat bottom reservoir having its inlet and its outlet interconnected by low resistance flow directing means to minimize turbulence.

It is a further object of this invention to provide a low resistance flow directing means between the inlet and outlet of a reservoir with provision for fluid communication with the interior of the reservoir affording maximum utilization of the reservoir capacity.

These and other objects and advantages of this invention will be apparent to those skilled in the art when the following description is read together with the accompanying drawings in which:

FIG. 1 is a side view of a lift truck in which the hydraulic system of this invention is installed;
FIG. 2 is a top view of a lift truck shown in FIG. 1;
FIG. 3 is a schematic diagram showing the hydraulic system incorporated into the lift truck shown in FIGS. 1 and 2;
FIG. 4 is a top view of the hydraulic reservoir of this invention with a part thereof shown in section;
FIG. 5 is a side view of a hydraulic reservoir shown in FIG. 4 with a part shown in section; and
FIG. 6 is a section on line VI—VI shown in FIG. 5.

Referring to FIGS. 1 and 2, a lift truck 11 has a mast 12 which is pivoted to the truck chassis 13 by a pair of pins 14, only one of which is illustrated. A pair of tilt rams 16, 17 have their lower ends pivotally connected to the truck chassis and have their upper ends pivotally connected to brackets extending from the rear of the primary uprights 18. A carriage 19 with forks 21, 22 is mounted on the secondary uprights 23 for vertical reciprocating movement relative thereto. The carriage 19 is raised and lowered relative to the secondary uprights by a single acting hydraulic ram 24 the bottom of which rests on the primary uprights and the top of which carries a pair of sprockets. As is conventional in the lift truck art, one end of a pair of link chains is connected to the primary uprights, the chains pass over the sprockets and the other end of the chains is connected to the carriage.

An operator's seat 26 is provided on the truck for the operator and a conventional steering wheel is provided for steering the lift truck through appropriate linkage, not shown, to the rear wheels.

A novel hydraulic reservoir 28 for supplying fluid for operation of the tilt rams 16, 17 and lift ram 24 is mounted on the truck just above the running clearance shown by broken line 30. This places the reservoir 28 in the lowest possible position on the truck and permits the fluid to be drained to the reservoir so that fluid will not be spilled when other hydraulic system components are removed for replacement or repair.

Referring to FIGS. 1 and 3 a pump 29 is driven by the fork truck engine 35, in a conventional manner and supplies fluid through conduit 31 to control valves 36, 37. Hand control levers 38, 39 operate valve spools 41, 42, respectively, of control valves 36, 37. The control valve 36 directs fluid to and from the double acting tilt ram 16 through a pair of conduits 43, 44 connected at opposite ends of the ram 16. Similar conduits connect double acting tilt ram 17 with valve 36 to operate ram 17 in parallel with ram 16. Suitable valves for achieving this function are well known to those experienced in the art, and need not be illustrated.

Control valve 37 directs fluid to and from single acting ram 34 through a single conduit 46. Valves for accomplishing this function are also well known to those experienced in the art and need not be illustrated.

Return fluid from the valves 36, 37 is directed to the reservoir through a conduit 47. Fluid is taken from the reservoir to supply the pump through a conduit 48.

Referring to FIGS. 3, 4 and 5 the reservoir 28 is made up of a flat bottom wall 51, side walls 52, 53, top wall 54 and end walls 56, 57. An extremely novel feature of this reservoir 28 is the structure provided for supplying hydraulic fluid to and removing hydraulic fluid from the reservoir. An outstanding feature of the arrangement is its simplicity. A conduit 61 of low flow resistance extends through openings 62, 63 in the side walls 56, 57, respectively. The ends of conduit 61 project from either side of the reservoir presenting threaded ends 64, 66. The conduit 61 is secured in fluid tight relation to side walls 56, 57 by suitable means such as by welding, as illustrated. The threaded ends 64, 66 of conduit 61 are connected to conduits 48 and 47, respectively, by suitable unions 67, 68.

The conduit 61 is located in close proximity to the bottom 51 of the reservoir 28 and has an elongated opening 76 formed in its underside. FIG. 6 shows the relative location between the bottom wall 51 of the reservoir 28 and the slot 76 in the conduit 61. The opening 76 is of greater area than the cross section area defined by the inside diameter of the conduit 61.

A plug 69 is provided for checking the level of the hydraulic fluid in the reservoir. A breather and filler tube 71 projects from the top of the reservoir and is covered by a cap 72 with a built-in filter element 73.

When the control lever 38 is moved to a position causing ram 16 to expand, fluid supplied by the pump will be pumped to the lower end of ram 16 and fluid from the upper end of the ram 16 will be forced to return to the reservoir 28. Since a greater amount of fluid will be taken by the pump from the reservoir than is returned to it, due to the presence of the piston rod in the upper end of the ram 16, a small amount of makeup fluid will be drawn through opening 76 into the conduit 61 to be added to the fluid returned to inlet end 66 of conduit 61. Thus when a double acting ram is operated using the combined inlet and outlet conduit 61 there is a minimum amount of turbulence created in the reservoir 28 since only a small amount of fluid is taken from the reservoir upon expansion of the ram and only a small amount of fluid is added to the reservoir upon contraction of the ram.

During operation of the single acting ram 24, near its completely extended position, the fluid in the reservoir 28 will be at its lowest level. As the ram 24 approaches its completely extended position, the pump 29 will often be operating at a high speed for fast efficient material handling.

The rapid withdrawal of fluid from the reservoir will tend to pull the level of the fluid down toward the exhaust opening of the reservoir and in prior art reservoirs it was not unusual for air to be drawn into the pump, resulting in erratic operation of the ram and undesirable foaming. This problem has led designers to provide a hood at the outlet. However, it was found that a reservoir supplied with the hood did not perform markedly better and provision of a hood was expensive.

The combined inlet outlet conduit 61 is not only relatively inexpensive to provide but affords superior performance to the hood arrangement. Instead of an outlet fitting, an inlet fitting and a hood, I provide a structure of superior performance through use of a single piece of conduit or pipe with a slot at its underside.

By actual test I have found that in one reservoir using hoods over the inlet and the outlet, respectively, at least one and one-half inches of oil was required in the reservoir to insure proper operation; whereas, with a reservoir of the same capacity using the combined conduit 61 the minimum fluid level was three-fourths of an inch. Thus by using this invention the cost of the reservoir is kept to a minimum, the usable volume of a given reservoir is increased, the space requirements on the vehicle are kept to a minimum, and the amount of hydraulic fluid for the hydraulic system is reduced.

It will be apparent to those skilled in the art that I have provided an extremely inexpensive solution to a problem that has confronted the industry for many years. I have provided a hydraulic system for an engine driven vehicle, including a hydraulic pump 29 driven by the engine, a reservoir 28 with a flat bottom near the running clearance and having a conduit 61 extending through the reservoir with an opening 76 in its underside, a hydraulic ram controlled by a valve and fluid conveying means operatively connecting the pump 29 to the valve, the valve to the ram, the valve to one end of the conduit 61 and the pump 29 to the other end of the conduit 61.

It should be understood that it is not intended to limit the invention to the illustrated and described embodiment and that the invention includes such other forms and modifications as are embraced by the scope of the appended claims.

The low fluid flow resistance afforded by conduit 61 minimizes turbulence in the reservoir. For instance, when the double acting rams or motors 16, 17 are operated or when no motors are being actuated but the engine is running, the fluid is conveyed smoothly from the inlet end 66 to the outlet end 64 by a round smooth interior conduit. Prior art devices dumped the fluid from the valve into the reservoir, dissipating the kinetic energy of the fluid through agitation of the fluid already in the reservoir. In prior art devices using hoods over the inlet, the return fluid is directed against the inlet hood and forced to flow under the hood to dissipate its kinetic energy to reduce turbulence in the tank. An outlet hood reduces the hydraulic gradient level at the outlet needed to maintain air free flow of fluid. Despite the provision of inlet and outlet hoods, the agitated fluid carries air with it to the pump when fluid in the reservoir is at a low level. During recirculating condition of fluid flow, as when the control valves are in a hold position, my combined inlet and outlet conduit avoids the problem of turbulence in the reservoir since the returning fluid is not dumped into the reservoir or mixed with the fluid in the reservoir en route. When the control valves 36, 37 are in a hold position, fluid is locked in the rams 16, 17, 24 and the full flow of fluid from the pump is bypassed through conduits 47, 61, 48 to the pump 29.

When the single acting motor or ram 24 is near its full extension, the level of fluid in the reservoir will be low and in this condition turbulence in the reservoir is most undesirable since cavitation is more apt to occur in turbulent fluid than in calm fluid. Thus with a hooded arrangement, the circulation of fluid through the reservoir, when the load is held by the ram 24 in near its fully extended condition, will be most unsatisfactory. Not only will the turbulence increase the likelihood of cavitation but also the fluid must accelerate from almost zero velocity within the reservoir to the velocity required in the pump supply line. The drawing of the entire pump supply from one point in a reservoir causes a gradient and where there is a low head of fluid this gradient is prone to permit undesirable cavitation. My combined inlet and outlet conduit avoids both these gradient and turbulence problems which are critical when the ram 24 is expanded and fluid is merely recirculated, since the velocity of the returning fluid is retained throughout its flow through the conduit and the return fluid passes from inlet to outlet without agitating the reservoir fluid.

The advantage of my invention is particularly evident when the fluid level in the reservoir is low, due to the carriage being held near its maximum height, and the pump continues to circulate oil at high velocity through conduit 61. High speed operation of the pump may occur with a raised carriage when maneuvering the truck, tilting the mast, operating auxiliary motors, not shown, or maintaining pressure in the hydraulic motors of well known attachments, such as clamps or push off devices.

What is claimed is:

In an engine driven vehicle with load supporting member the combination comprising: an engine driven fluid pump, a hydraulic motor for raising said member, a control valve for controlling the flow of fluid to and from said motor through fluid conveying means and having a hold position blocking flow to and from said motor and bypassing the pumped fluid, fluid conveying means connecting said pump to said control valve, a hydraulic fluid reservoir supported on said vehicle and having a substantially flat bottom, a tube extending along and in close proximity to said bottom of said reservoir and having an opening in its underside permitting substantially all of the fluid to be pumped from said reservoir without cavitation, fluid conveying means connecting said valve to one end of said tube and fluid conveying means connecting the other end of said tube to said pump, when said valve is in said hold position said hydraulic fluid is circulated through said tube en route from said valve to said pump without producing turbulence in said tube and in the fluid stored in said reservoir.

References Cited in the file of this patent

UNITED STATES PATENTS

| | | |
|---|---|---|
| 2,100,440 | Gossler | Nov. 30, 1937 |
| 2,543,989 | Rockwell | Mar. 6, 1951 |
| 2,554,930 | Ulinski | May 29, 1951 |
| 2,616,768 | Stemm | Nov. 4, 1952 |
| 2,619,304 | Feeney et al. | Nov. 25, 1952 |
| 2,737,061 | Kelley | Mar. 6, 1956 |
| 3,002,355 | Brackin | Oct. 3, 1961 |